(12) United States Patent
Morrison et al.

(10) Patent No.: US 6,421,744 B1
(45) Date of Patent: Jul. 16, 2002

(54) DIRECT MEMORY ACCESS CONTROLLER AND METHOD THEREFOR

(75) Inventors: Gary R. Morrison; Kristen L. Mason, both of Austin; Frank C. Galloway, Dripping Springs; Charles E. Nuckolls, Austin; Jennifer L. McKeown, Austin; Jeffrey M. Polega, Austin; Donald L. Tietjen, Austin, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/426,009

(22) Filed: Oct. 25, 1999

(51) Int. Cl.[7] .................................................. G06F 9/28
(52) U.S. Cl. .............................. 710/22; 710/68; 710/23; 710/31; 710/33; 711/148; 711/162; 711/202
(58) Field of Search ............................ 710/22, 23, 31, 710/33, 26, 62; 711/100, 148, 202, 165

(56) References Cited

U.S. PATENT DOCUMENTS

| | | | | |
|---|---|---|---|---|
| 5,404,522 A | * | 4/1995 | Carmon et al. | 709/107 |
| 5,857,114 A | * | 1/1999 | Kim | 711/100 |
| 5,890,218 A | * | 3/1999 | Ogawa et al. | 711/148 |
| 5,996,032 A | * | 11/1999 | Baker | 710/62 |
| 6,006,286 A | * | 12/1999 | Baker et al. | 710/22 |
| 6,185,634 B1 | * | 2/2001 | Wilcox | 710/26 |
| 6,223,268 B1 | * | 4/2001 | Paluch, Jr. et al. | 711/201 |

* cited by examiner

Primary Examiner—Than Nguyen

(57) ABSTRACT

Direct memory access controller (DMAC) (54) adapted to directly execute C language style FOR tasks assigned by a processor (70), where the FOR task includes a movement of a data element from a first location to a second location in memory. The DMAC includes multiple execution units (EUs) (88, 90, 92), each to perform an arithmetic or logical operation, and a FOR task controller (80, 82, 86) to perform the data movement. The FOR task controller selects the operation to be performed by the EU. In one embodiment, the FOR task is made up of C language type FOR loops, where descriptors identify the control and body of the loop. The descriptors identify the source of operands for an EU, and the source may be changed within a FOR task. A descriptor specifies a function code for an EU and may specify multiple sets of operands for the EU.

22 Claims, 9 Drawing Sheets

LCD (BASIC):

| 31 | 30 29 | 28 | 23 22 21 20 | 15 14 | 13 12 | 11 | 6 | 5 | 3 | 2 | 0 |
|---|---|---|---|---|---|---|---|---|---|---|---|
| LCD=1 | EXT | * | INDEX 0 INITIALIZATION | + | * | INDEX 1 INITIALIZATION | TERM USAGE | * | TERMINATION CONDITION | INDEX 0 INCREMENT VAR | INDEX 1 INCREMENT VAR |

FIG.6

DRD1A (NO EXTENSIONS ALLOWED):

| 31 | 30 | 29 | 28 | 27 | 26 25 | 21 20 19 | 18 17 | 16 | 11 10 | 4 | 3 | 0 |
|---|---|---|---|---|---|---|---|---|---|---|---|---|
| LCD=0 | EXT=0 | TYPE=0 | MORE | TFD | INT | INITIATOR | READ DATA SIZE | WRITE DATA SIZE | MEMORY WRITE DESTINATION | MEMORY WRITE SOURCE | | EXECUTION UNIT FUNCTION NUMBER |

FIG.7

DRD2A (INITIAL):

| 31 | 30 | 29 | 28 | 27 | 26 25 | 21 20 19 | 18 17 | 16 | 15 | 12 | 11 | 8 | 7 | 4 | 3 | 0 |
|---|---|---|---|---|---|---|---|---|---|---|---|---|---|---|---|---|
| LCD=0 | EXT=1 | TYPE=1 | MORE | TFD | INT | INITIATOR | READ DATA SIZE | WRITE DATA SIZE | RSRV | EXECUTION UNIT-0 FUNCTION NUMBER | EXECUTION UNIT-1 FUNCTION NUMBER | EXECUTION UNIT-2 FUNCTION NUMBER | EXECUTION UNIT-3 FUNCTION NUMBER |

FIG.8

DRD2B1 (EXTENSION):

| 31 | 30 | 29 28 | 27 | 22 21 | 20 | 14 13 12 | 11 | 6 | 5 | 0 |
|----|----|-------|-----|--------|------|-----------|-----|-----|-----|-----|
| LCD=0 | EXT | TYPE=0 | RSRV | MEMORY WRITE DESTINATION | RSRV | MEMORY WRITE SOURCE | EXE UNIT NUMBER | EXECUTION UNIT OPERAND 0 SOURCE | | EXECUTION UNIT OPERAND 1 SOURCE |

{ EUA: bits 0–14 }

FIG. 9

DRD2B2 (EXTENSION):

| 31 | 30 | 29 28 | 27 26 25 | 20 | 14 13 12 | 11 | 6 | 5 | 0 |
|----|----|-------|-----------|-----|-----------|-----|-----|-----|-----|
| LCD=0 | EXT | TYPE=1 | RSRV | EXE UNIT NUMBER | EXECUTION UNIT OPERAND 0/2/4/6 SOURCE | EXECUTION UNIT OPERAND 1/3/5/7 SOURCE | EXE UNIT NUMBER | EXECUTION UNIT OPERAND 0/2/4/6 SOURCE | | EXECUTION UNIT OPERAND 1/3/5/7 SOURCE |

{ EUB: bits 15–27 } { EUA: bits 0–14 }

FIG. 10

INITIATOR/TASK REGISTERS

| TASK # | INITIATOR | ENL | VLD |
|---|---|---|---|
| 0 | RX1 | | |
| 1 | TX1 | | |
| 2 | USB RX | | |
| 3 | TIMER0 | | |
| ⋮ | | | |
| 15 | | | |

LOOP REGISTERS

| | DYNAMIC VALUE[31:0] | INC PTR | NEST LEVEL |
|---|---|---|---|
| 0 | | | |
| 1 | | | |
| 2 | | | |
| ⋮ | | | |
| 31 | | | |

TERMINATION REGISTERS

| | TERMINATION VALUE[31:0] | CMP TYPE | LOOP REG# |
|---|---|---|---|
| 0 | | < | |
| 1 | | <= | |
| ⋮ | | | |
| 7 | | ETC | |

INCREMENT REGISTERS

| | INCREMENT VALUE[15:0] |
|---|---|
| 0 | |
| 1 | |
| ⋮ | |
| 7 | |

*FIG. 13*

DIRECT MEMORY ACCESS CONTROLLER AND METHOD THEREFOR

FIELD OF THE INVENTION

The present invention relates to direct memory access in a data processing system, and specifically to controlling direct memory access using a user-programmable algorithm.

BACKGROUND OF THE INVENTION

Direct Memory Access (DMA) controllers are used in computer systems to offload repetitive data movement tasks from a processor in a data processing system. As the demand for increased performance of the processor, or central processing unit (CPU), increases so does the need for high-throughput, flexible DMAs that work well with these processors. Original DMA controllers (DMACs) used only registers or memory storage devices to specify source, destination, and length of data to be transferred. The DMAC was coupled to only one source device. Soon the need to carry out simultaneous block transfers led to the development of multi-channel DMACs that achieved the effect of performing several data movements simultaneously. As data transfer rates continued to increase, set up, service and interrupt overhead for the DMACs became too high, especially when the DMAC was programmed for a single contiguous block of memory per interrupt.

To overcome these overhead issues, descriptor-based DMACs were introduced. As the computer system complexity increased, so the DMACs increased in complexity. Today, some DMACs use a dedicated processor to perform such complex functions. The dedicated processor, or coprocessor, is often based on a reduced instruction set computer (RISC) methodology. Such coprocessors operate on increasingly complex protocols, and often provide algorithmic support, such as digital filtering operations. The algorithmic support is critical to many applications where data movement and calculation rates are high. This is particularly true of entertainment applications, such as video, graphic and audio applications, and is also important in areas such as audio and visual decompression calculations. While the need for flexible algorithmic manipulation of data by the DMAC increases, the coprocessor becomes less attractive as it operates on a data-structure descriptor architecture which has limited flexibility and it can not achieve the high performance of the dedicated state machine of a traditional DMAC.

Therefore, there is a need for a DMAC that provides algorithmic support using descriptors that define DMA algorithms instead of data structures. Additionally, there is a need for a flexible method of programming a DMAC with simple building blocks. Further, a need exists for a method of programming a DMAC that allows easy expansion for additional and complex data manipulations.

Still further, as imaging and entertainment applications continue to move and manipulate large amounts of data in a variety of ways, there is a need to allow the user to specify the functions done in a DMA, and a further need to increase the throughput capabilities of a DMA to accommodate the ever increasing data sizes.

BRIEF DESCRIPTION OF THE DRAWINGS

The present invention may be more fully understood by a description of certain preferred embodiments in conjunction with the attached drawings in which:

FIGS. 6–10 illustrate descriptors within a DMA controller as in FIGS. 3–4 in accordance with one embodiment of the present invention.

FIGS. 12–13 illustrate tables and pointers within a DMA controller as in FIGS. 3–4 in accordance with one embodiment of the present invention.

DETAILED DESCRIPTION OF THE PREFERRED EMBODIMENTS

Figure 1:
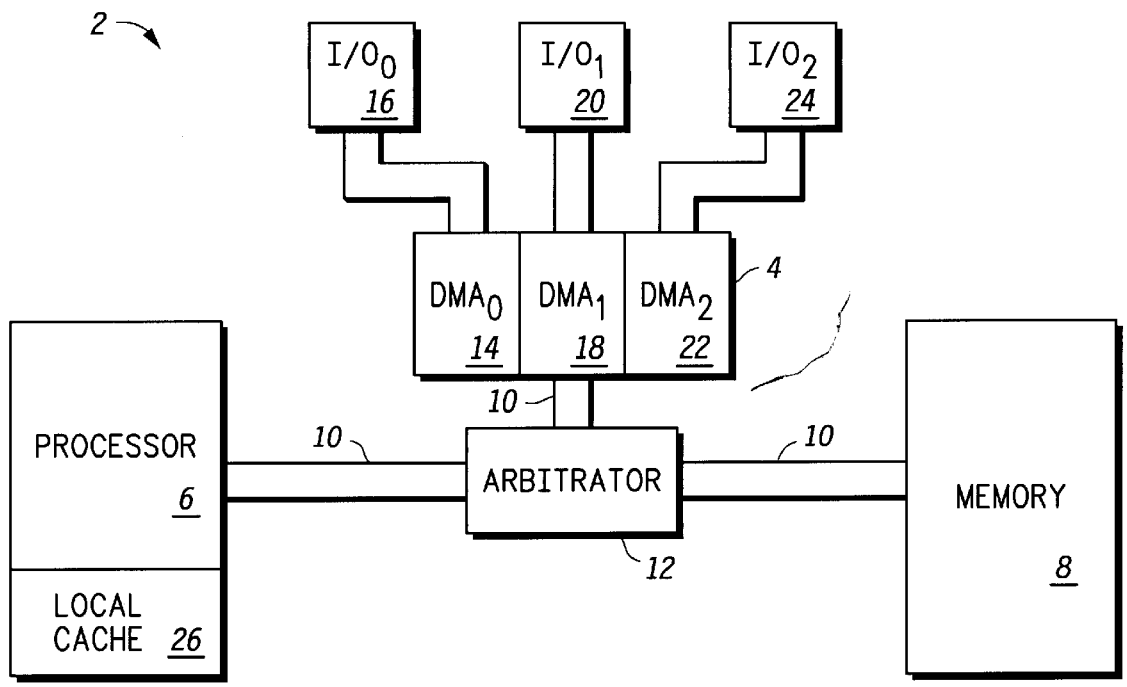
FIGS. 1–2 illustrate, in block diagram form, prior art data processing systems having DMA controllers.

For clarity the terms assertion and negation are used herein to avoid confusion regarding "active-low" and "active-high" signals. The term assert or assertion is used to indicate that a signal is active or true, independent of whether that level is represented by a high or a low voltage. The term negate or negation is used to indicate that a signal is inactive or false.

In one aspect of the present invention, in a data processing system, comprising a processor and a memory coupled to the processor, a data movement engine (DME) is adapted to directly execute FOR tasks assigned by the processor, said task including a movement of a data element from a first location in said memory to a second location in said memory. The DME includes an execution unit (EU) adapted to perform a selected one of an arithmetic operation and a logical operation, and a FOR task controller adapted to perform said data movement and to select, in response to said FOR task, one of the arithmetic operation and the logical operation to be performed by the EU on said data element. The DME directly executes FOR tasks by a state machine within the DME. The FOR tasks describe functions to be performed by an EU and are made up solely of C language style FOR loops. With these FOR loops, the FOR tasks may perform any number of functions including arithmetic and logical functions for digital signal processing (DSP) operations like filtering, or various aspects of data communication protocols.

In another aspect of the present invention, in a data processing system, having a processor and a memory coupled to the processor, a method for moving data includes the steps of: the processor assigning a FOR task, the FOR task including a movement of a data element from a first memory location to a second memory location; retrieving the data element from the first memory location; selecting one of an arithmetic operation and a logical operation to perform on the data element; performing the selected one of the arithmetic operation and the logical operation on the data element; and storing a result of the selected one of the arithmetic operation and the logical operation on the data element to the second memory location.

In still another aspect of the present invention, in a data processing system, comprising a processor and a memory coupled to the processor, a data movement engine (DME) is adapted to directly execute tasks assigned by the processor, said task including a movement of a data element from a first location in said memory to a second location in said memory. The DME includes a task controller adapted to perform said data movement and to select, in response to said task, one of the arithmetic operation and the logical operation to be performed by the EU on said data element; and a priority selection unit adapted to select a requester from a plurality of requesters.

In one embodiment of the present invention, in a data processing system having a processor, an execution unit, and a memory storage location for storing an instruction descriptor where the instruction descriptor includes: a first field identifying an operation code; a second field identifying a first operand set corresponding to the operation code; and a third field identifying a operand set corresponding to the operation code. In one embodiment of the invention, the operand sets are stored successive storage locations., such as in data routing descriptors (DRDs).

The present invention allows a DMA to switch DMA requesters within a single FOR task to accomplish a complete algorithm. In this way, a FOR task may be written to encompass every step of the data flow even when the requesting device changes throughout the task. The requester, or DMA initiator, is identified in a descriptor on a per-movement basis.

The present invention provides a DMA controller, implemented in one embodiment as a hardware block, that interfaces with on-chip peripherals having memory storage capabilities with only minimal processor intervention. Complex algorithms may be implemented using iterative loops and multiple execution units (EUs). The descriptors describe the algorithm or task and may be used to identify a requestor associated with each step in the task. The descriptor provides a fill-in-the-blanks form for C language type for loop constructs, referred to herein as "FOR loops," and data movements. The "FOR task" is a type of envelope, where the user fills in the specifics, but the task is according to the FOR loop format. This allows easy programming in C language code, with the restriction that only FOR loops are used. The FOR loop provides a construct that may be used to implement "while loops" and "if" statements.

The DMA is responsive to a processor as well as sources, referred to as "initiators." The term is derived from their function to initiate DMA activity. The terms initiator and requester may be used interchangeably. Initiators may be input/output (I/O) devices, or may be input only or output only. The initiation of DMA activity for I/O initiators is sensitive to threshold levels associated with first-in-first-out buffers (FIFO), where such levels indicate the presence of received data or an empty or near-empty transmitter. Other initiators may be timer outputs, a custom co-processor, an always true source, a communication semaphore, or any other condition that initiates a DMA transfer.

In one embodiment, a priority table is implemented ranking the priority of initiators within the data processing system. The priority table selects a highest priority requestor for processing. Each DMA has a predetermined number of tasks, that may be user defined, each having a task number. An association between requestor and specific task number indicates the task to be performed for each initiator. Once the processor assigns, or enables, a task, the associated requestor is identified by each loop in the FOR task, and if there are no conflicts, that requestor's task is performed by the DMA.

The DMA interprets C language style FOR loop encodings, each represented as a sequence of descriptors. In one embodiment the descriptors are 32-bit descriptors. The variable initialization, termination conditions, and increment amount for each FOR loop are encoded into loop control descriptors (LCDs). Each LCD is capable of defining variables. The functions and routing of operands, or data to implement the loop body, are encoded into data routing descriptors (DRDs). A DRD can define operations using variables, and can define a write destination. Each DRD can be extended to multiple descriptors in order to define complex routing and operations. Loops may nest, and within an inner loop, multiple DRDs in sequence may be used to accomplish more than one write destination per loop iteration.

The DMA works with an assembler to parse code segments written in C language syntax. The assembler then maps them to equivalent representations of LCDs and DRDs according to mappings defined in the appropriate descriptor section. The assembler also assigns variables in accordance with mappings associated with a Variable Table. The assembler also assigns values in accordance with the mappings associated with a Task Table. The assembler function is performed by an external software application to encode the fill-in-the-blank bit fields of the LCDS and DRDs from human-readable C-language source code. The assembler implements an almost direct mapping from the source code to the descriptors.

The DMA has a limited programming model accessible by the user. The Task Descriptors, Task Table, and Variable Table(s) are loaded by the user prior to enabling the DMA. Each of which is described in detail hereinbelow.

Figure 2:
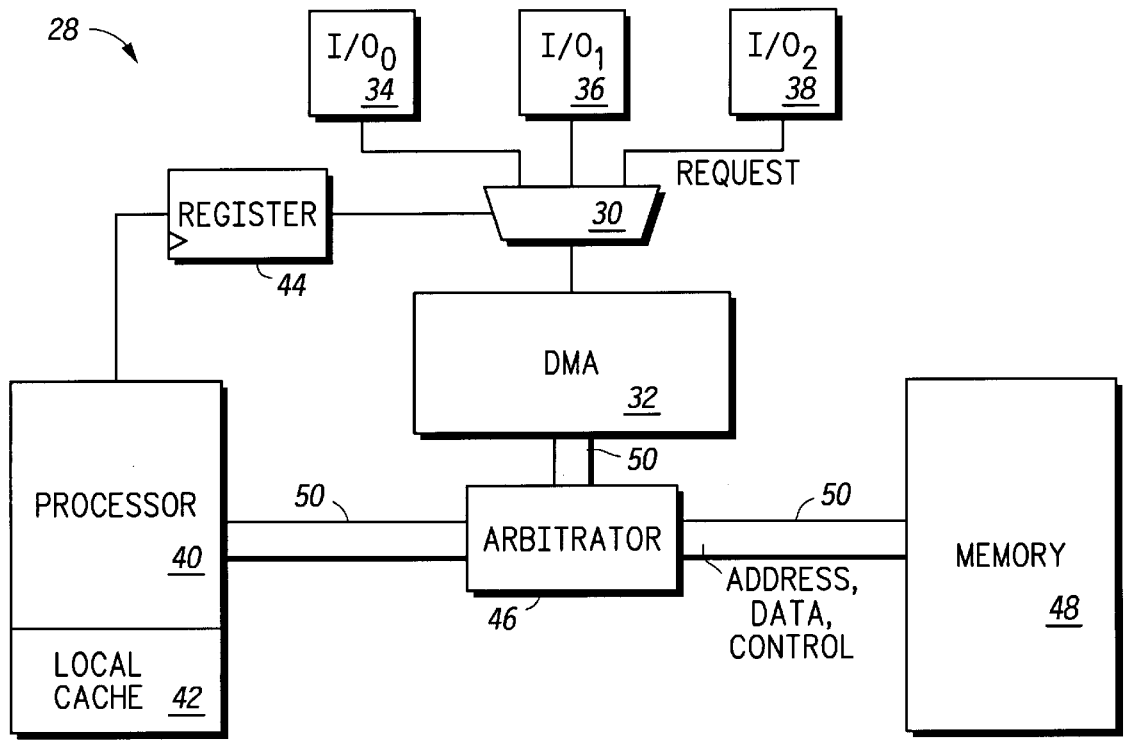

The present invention will be described with reference to two prior art data processing systems, each having a direct memory access (DMA) unit as illustrated in FIGS. 1 and 2. FIG. 1 illustrates a prior art data processing system 2 having a direct memory access unit (DMA 4), a processor 6, a memory 8. The processor 6, the memory 8, and the DMA 4 are coupled via multiple buses 10, where data, address and control information is transmitted over the buses 10 and controlled by an arbiter, specifically arbitrator 12. The processor 6 initiates a data transfer transaction by writing to a register in the DMA 4.

The DMA 4 includes three portions, each portion operating as an individual DMA unit. A first portion, $DMA_0$ 14, is coupled to an input/output device, $I/O_0$ 16, and is dedicated for transferring data to and from the I/O0 16. A second portion, $DMA_1$ 18, is coupled to an input/output device, $I/O_1$ 20, and is dedicated for transferring data to and from the I/O1 20. A third portion, $DMA_2$ 22, is coupled to an input/output device, $I/O_2$ 24, and is dedicated for transferring data to and from the I/O2 24. Each DMA portion operates as an individual DMA unit, having registers for storing source and destination addresses, length of data to be transferred, and any other information necessary to effect the transactions. Each DMA portion is coupled to a dedicated I/O unit by a bus and is responsive to requests from the I/O unit. Note that the processor 6 includes a local cache region 26, which may include data and/or instruction portions.

In operation, data processing system 2 will initiate a transaction with the DMA 4 by initializing the channel, i.e. selecting one of the I/O devices and its associated DMA portion for data transfer. The processor 6 loads registers in the DMA with control information, address pointers, and transfer counts. The processor 6 then starts the channel. In this way, the processor 6 enables one of the I/O devices, which then generates a request to the associated DMA.

In response to the request, the DMA transfers data until termination of a data block. During the data transfer phase, the DMA accepts requests for operand transfers and provides addressing and bus control for the transfers. The termination phase occurs after the operation is complete, when the DMA indicates the status of the operation in a status register. Note that each DMA portion, DMA0 14, DMA1 18, and DMA2 22, is dedicated to one of the I/O devices, I/O0 16, I/O1 20, and I/O2 24. In other words, the sources are each coupled to a dedicated DMA. Therefore each DMA portion, DMA0 14, DMA1 18, and DMA2 22, includes address registers, and control registers, as well as a storage location for transfer counts. The processor 6 enables one or more of the I/O devices, which then generates a request to the associated DMA.

In the data processing system 2 of FIG. 1, the DMA 4 is configured with dedicated channels coupling each I/O device to an associated portion of the DMA. In contrast, FIG. 2 illustrates a data processing system 28 having a multiplexer (MUX 30) that selects one I/O device for input to DMA 32. The I/O devices include $I/O_0$ 34, $I/O_1$ 36, and $I/O_2$ 38, that are coupled to MUX 30. The data processing system 28 includes a processor 40 having a local cache 42. A register 44 is coupled to the MUX 30, where the register 44 provides selection control for the MUX 30. The data processing system 28 includes an arbitrator 46, a memory 48, and buses 50 for transferring address, data and control information. The DMA 32, the arbitrator 46, the processor 40, and the memory 48 are each coupled to the buses 50. In this embodiment, the processor 40 selects the I/O device for the transfers.

In contrast to the prior art DMA methods, the present invention provides a DMA unit, i.e. DMA controller, that controls data transfers and other operations using a high-level programming language construct. In one embodiment, the DMA unit uses C-language constructs, and specifically FOR loop constructs. The C-language and the FOR loop constructs are described in detail in "The C Programming Language," by Brian W. Kernighan and Dennis M. Ritchie, published by Prentice Hall, having copyright 1988.

According to one embodiment of the present invention, the DMA unit is a user-programmable engine that interprets a series of C language FOR loop style descriptors to perform a user configurable series of data movements and manipulations. A collection of these descriptors is much like a software program. There are two types of descriptors: Loop Control Descriptors (LCDs) and Data Routing Descriptors (DRDs). These descriptors form a C language FOR loop programming for the DMA. This adds to the flexibility of prior art DMA units by off-loading compute resources from the processor, while increasing the ease of use for the programmer. Additionally, this improves performance as the FOR loop may be performed by highly optimized, dedicated purpose DMA state machines. The DMA architecture is optimized for very high throughput over complete processing generality meaning that it functions under the command of a processor.

With respect to the C-language constructs, the FOR loop has the general form:

```
for (<initial index value(s)>; <termination condition(s)>;
<increment value(s)>)
    {
    /*loop body*/
    }
``` where the "index initial value" initializes the loop and is therefore done before the loop proper is entered. The "termination condition" is a test that controls the loop. Note that although it is called a termination condition it is thought of as a loop continuation condition, as the loop only continues while the termination condition is true. After each iteration of the loop, the increment step is executed, and the termination condition is again checked. If the termination condition is false, then the loop terminates. The body of the loop may be any number of lines. Typically, in a FOR loop the initialization and increment are logically related.

As discussed hereinabove, descriptors include LCDs and DRDs. The LCDs specify the index variables, such as memory pointers, byte counters, etc. along with the termination and increment values, while the DRDs specify the nature of the loop body, i.e. how data gets pumped to and from memory and how execution units manipulate data. Inner loops may initialize and compare their loop-index variable(s) to outer loops variable(s), allowing the DMA to perform a variety of useful functions. Further, the DMA looping structure allows it to perform indirections and additions in a loop's loop-index initialization, adding flexibility to the available functions. The DMA also supports nested looping within this programming model.

As an example, a DMA program, listed as a sequence of LCDs and DRDs, is as follows:

| LCD1 | for(i=0; i<3; i++) { |
| LCD2 | for (j=0; j<i; j++) |
| DRD2 | *j = *i; |
| DRD1 | *i = 5; |
| | } |

Each line in the DMA program above represents a successive memory location occupied by the indicated LCD or DRD.

In this example, LCD1 provides the initialization value, termination condition, and step size for a FOR loop. The variable i is initialized to zero (0) and the loop continues iterations while i is less than three (3). On each iteration, the variable i is incremented. Nested inside this outer FOR loop is a FOR loop with another loop index variable, j, which is initialized to zero (0) and is incremented on each iteration of this inner loop. The DRD information is the body of the loop. On each inner-loop iteration, variable i is used as a memory address of data that is to be moved to the memory location addressed by the variable j.

Similarly, on each outer-loop iteration, variable i holds the address of the memory location into which a value of five (5) is to be written. While this is a straightforward example, it illustrates the use of LCDs and DRDs as building blocks to construct programs or algorithms within the DMA controller.

The DRDs are descriptors that describe assignment statements within the body of the loop in terms of data flow and manipulation. For example, data in the body of the loop may be multiplied together, in which case the DRD will specify data flow through a multiplier for this operation. Similarly, if a logical operation, such as an AND, is indicated, the DRD will specify a data flow through a logic unit for completing this operation. The body of the loop may include a number of levels and combinations of these type functions.

Using the C language constructs and structures, the present invention allows simple encoding of a broad range of applications, including but not limited to simple peripheral to memory transfers, simple memory to memory transfers, simple one-dimensional processing of data, functions of two or more variables, filtering algorithms, such as finite impulse response (FIR), and infinite impulse response (IIR), and also scatter-gather processing via the indirection capability. Additional processing available includes but is not limited to sample format conversion, data decompression, bit-block transfers, color conversion, as well as drawing characters. Note that program model memory regions may exist in any memory-mapped space within the data processing system.

To better understand the utilization of programming constructs to implement such applications, it is desirable to define a few terms. According to the present invention, a "descriptor" is a piece of information, typically a predetermined number of bits, that describes a portion of an algorithm, or location of data, or information relating to any other function to be performed within the DMA. This is in contrast to prior art descriptors that were used to indicate memory locations for data movement, but did not include descriptive information necessary to execute an algorithm. A "task" as used throughout this description is a collection of LCD and DRD descriptors that embodies a desired function. A task could include the steps of gathering an ethernet frame, performing some function on the data content, and storing the result in memory. Additionally, the task could complete by interrupting the processor. The DMA will support multiple enabled tasks simultaneously.

Figure 12:
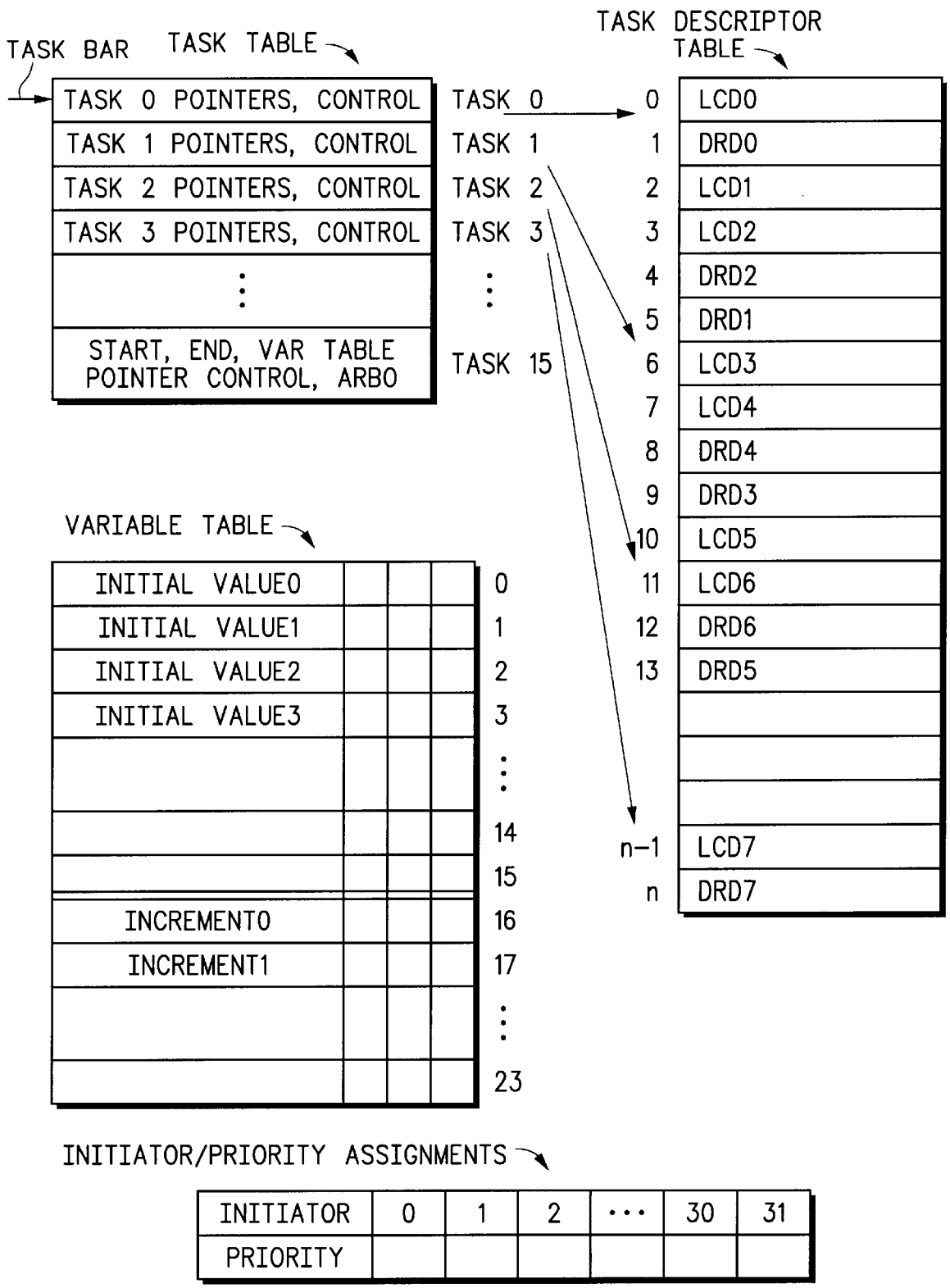

A "task table" is a region in memory that contains pointers to each of the DMA program model components on a per-task basis. A register within the DMA, referred to as a "TASKBAR" or task table base address register, gives the location of the task table itself. The entries in the task table define task begin and end pointers, its variable table pointer and other task-specific information. Alternate embodiments may include a subset of this information or may include additional information. The task table points to the tasks in a "task descriptor table," that is a task-specific region in memory containing descriptors that specify the sequence of events for each task. Each task has its own private variable table. FIG. 12 illustrates the interaction of the TASKBAR, the task table, the task descriptor table, and the variable table according to one embodiment. Alternate embodiments may store the LCDs and DRDs in an alternate arrangement or using an alternate storage means.

Figure 3:
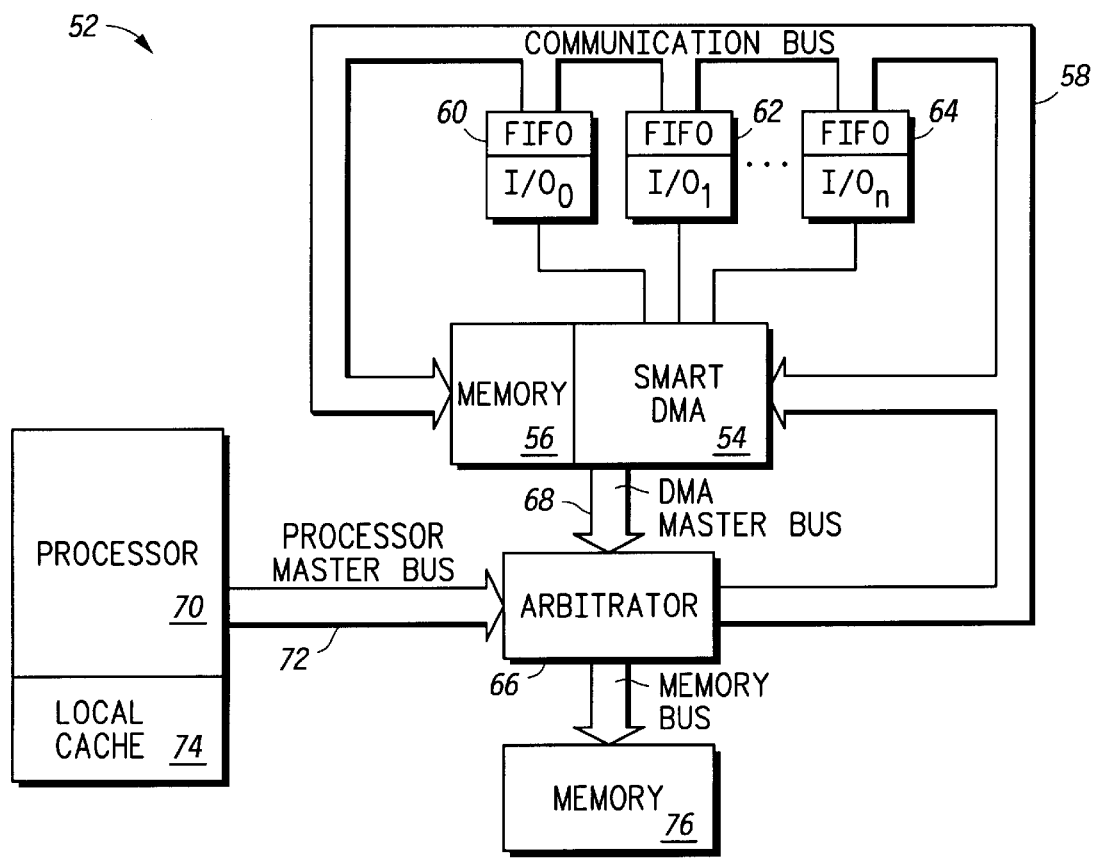
FIG. 3 illustrates, in block diagram form, a data processing system having a DMA controller in accordance with one embodiment of the present invention.

FIG. 3 illustrates a data processing system 52 according to one embodiment of the present invention. The data processing system 52 includes a DMA 54, referred to as a SMART DMA, that performs direct memory access transactions incorporating a user-programmable algorithm. The DMA 54 includes a memory portion 56 for storing operational information, such as descriptor storage and/or data buffers. The DMA 54 and the memory portion 56 are both coupled to a communication bus 58, where the communication bus 58 is also coupled to a plurality of input-output (I/O) devices each having a FIFO, including I/$O_0$ 60, I/$O_1$ 62, through I/$O_n$ 64.

Each of the I/O devices is coupled to the DMA 54. The communication bus 58 is also coupled to an arbitrator 66, where communication bus 58 is used to communicate address and control information, plus data and tag information. The DMA 54 provides information to the arbitrator 66 via a DMA master bus 68.

The data processing system 52 also includes a processor 70 coupled to the arbitrator 66 via a processor master bus 72. Address and control information, along with data information is communicated via the processor master bus 72. The processor 70 includes a local cache 74, including instruction(s) and/or data.

In the data processing system 52, the processor 70 initializes the memory regions relating to the DMA 54, including registers, and tables for storing descriptor information and task information. This involves filling the appropriate memory locations. Initialization is performed at start-up and may also be performed at any time, such as on occurrence of an error condition or to reconfigure the system. This information may be stored in the memory portion 56 or in memory 76 or in a combination of both.

Figure 4:
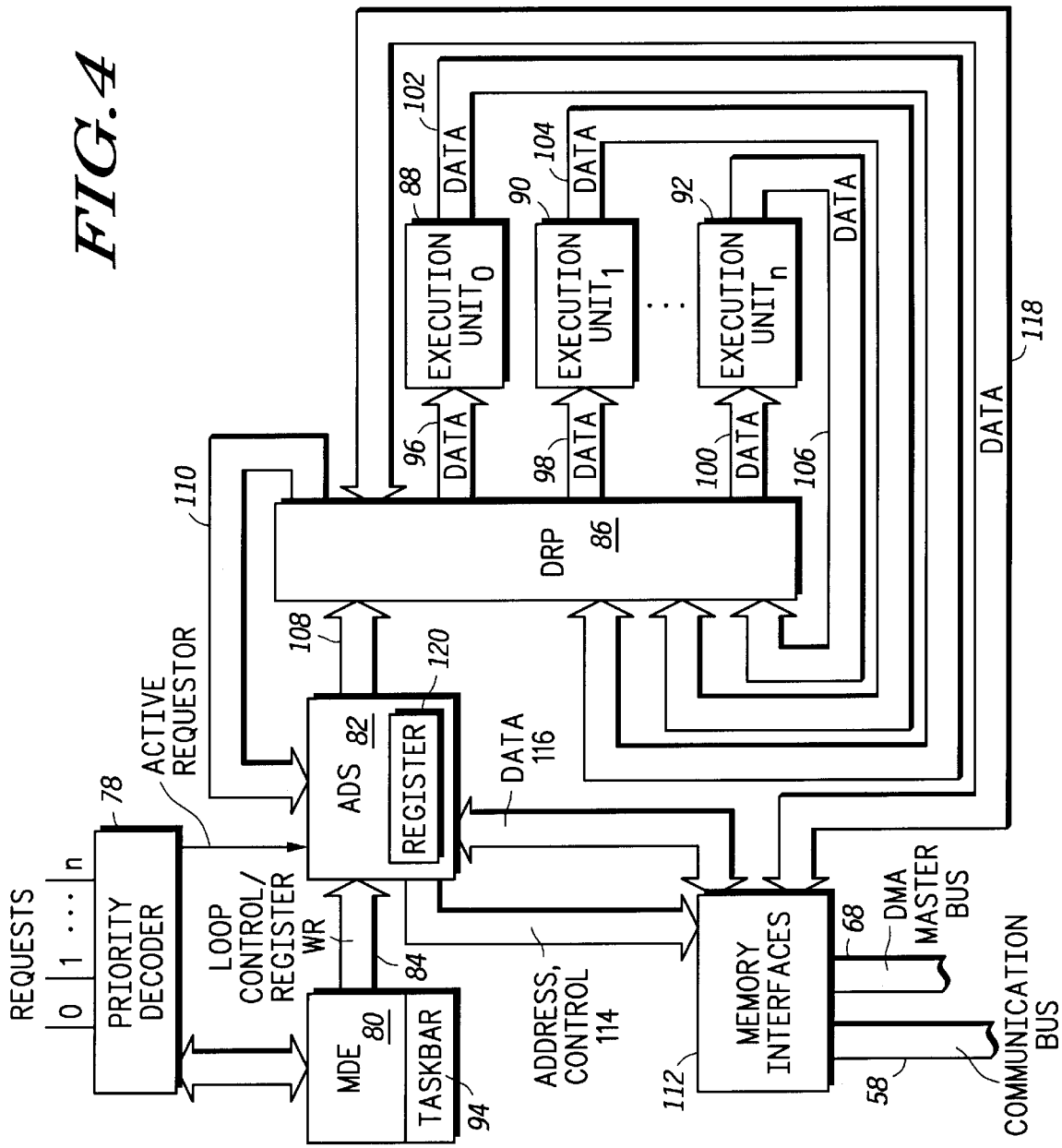
FIG. 4 illustrates, in block diagram form, a DMA controller as in FIG. 3 in accordance with one embodiment of the present invention.

FIG. 4 details the DMA 54 where connections to the I/O devices are indicated as REQUESTS 0, 1, through n. The DMA 54 includes a priority decoder 78 that communicates with a master DMA engine (MDE 80) and an address and data sequencer (ADS 82). The MDE is coupled to the ADS by way of a loop control bus 84. The DMA 54 also includes a data routing pool (DRP 86) coupled to a plurality of execution units, including $EU_0$ 88, $EU_1$ 90, through $EU_n$ 92. The priority decoder 78 provides an active requestor to the ADS 82.

A task is started by setting predetermined enable bit(s) within the DMA 54, in response to which the DMA 54 accesses the memory locations where descriptor and task information is stored. The set enable bit(s) indicate a task number corresponding to a task to be performed. Note that in the present embodiment, multiple tasks may be identified by the set bit(s), where each of the multiple tasks is enabled. The DMA 54 first reads a register in the MDE 80, labeled as TASKBAR 94, that provides information relating to an origin location within a task table stored in memory, either memory 76 or the memory portion 56. Note that the TASKBAR register may be located in another functional block, where the information is accessible by the MDE 80. The MDE 80 calculates the origin location in the task table. These registers and tables are further detailed hereinbelow with respect to FIGS. 12 and 13. The task table stores multiple task-specific pointers to at least one task descriptor table. In one embodiment, the pointers include task descriptor start and end pointers, a variable table pointer, a function descriptor base address, configuration bit(s), status information, base address for context save space, and literal-initialization LCD base information.

The task descriptor table stores algorithmic descriptors, which are used to implement a user-programmable algorithm. In one embodiment, the algorithm is written in C-language constructs, and each task is composed of at least one FOR loop. Each FOR loop is made up of at least one loop control descriptor (LCD) and at least one data routing descriptor (DRD). The DRD defines the body of the loop, while the LCD provides the initialization value(s), the increment(s), and the termination condition(s) for the FOR loop.

The DMA 54 retrieves the task information from the task descriptor table corresponding to the task identified by the enable bit(s). The DMA 54 then parses the task information. Parsing involves retrieving LCD and DRD information from the Task Description Table, reading the first loop, decoding at least a portion of the C-encoded LCDs and DRDs stored in the task information, and determining a requester. The parsing is performed within the MDE 80 and provides the decoded information to the ADS 82. The decoded information then initializes loop index, termination, and increment registers within the ADS 82. The parsed task information identifies a requestor, and the MDE 80 waits to receive a request from that requester before instructing the ADS 82 to begin processing. Operation of the ADS 82 and the MDE 80 are further detailed hereinbelow.

Continuing with FIG. 4, one embodiment of the invention allows for dynamic request selection. Here, multiple requests are provided to the priority decoder 78 from multiple I/O devices. The priority decoder 78 selects from among the inputs. The initiator/task registers determine which task to parse and process based on the selected requester, where the selection is made according to information contained within the DRDs of the active task.

The priority decoder 78 selects a highest priority requester for processing based on a priority table. The selection is made of those requesters that are currently making a request to the DMA 54. The priority table allows for a predetermined number of priority levels. The priority decoder 78 includes registers that define associated task number and the priority of each request unit. The priority decoder 78 provides handshake signals in response to request inputs. The priority decoder 78 allows programming of each task for external request, priority of request, auto-start of task, interrupts, etc. In alternate embodiments, priority may be based on schemes such as round robin, time sliced, first in, fixed, last in, etc.

An association is made from a requestor to a specific task number, in the present embodiment numbers 0 to 15. The specific task is executed until the initiator removes the request. Note that while a task is executing, a higher priority requester may interrupt the task. Interruptions occur at loop iteration boundaries.

Upon receiving a request from the priority decoder 78, the ADS 82 reads data according to the order specified in the DRD retrieved from the memory 76. Note that data may be retrieved from an EU, an internal loop register, or a memory read. If the data is routed to an EU, the data is run through a predetermined data path in the DRP 86 according to descriptor information. As illustrated in FIG. 4, data flows from the DRP 86 to the appropriate one or more of the execution units. Each of the execution units has a specific assigned function for a given DRD. In this way, they are configurable and may be user programmed by changing the information in the DRD. This adds flexibility to the DMA 54 by providing a means of implementing any combination of these functions. From the execution unit, manipulated data flows to the DRP 86 for further routing to another of the execution units or to memory or to an internal loop register via the ADS 82.

As discussed hereinabove, the DRD descriptors provide information relating to the body of the loop in terms of data flow and manipulation. If the DRD specifies that two terms are to be multiplied together and then the result is to be logically ANDed with another term, the ADS 82 will first route data through the DRP 86 to the particular execution unit that performs the multiplication. The output of the execution unit is provided via a data bus back to the DRP 86. The ADS 82 then directs data via the DRP 86 to the execution unit that performs the AND operation. The result of this execution unit is then provided back to the DRP 86, which routes the result to the ADS 82. The result is then stored in the memory or to loop register as specified in the body of the loop. To facilitate this data flow, each execution unit, EU0 88, EU1 90, through EUn 92 is coupled to and receives data from the DRP 86 via data bus 96, data bus 98, through data bus 100 respectively. Similarly, each execution unit, EU0 88, EU1 90, through EUn 92 is coupled to and provides data to the DRP 86 via data bus 102, data bus 104, through data bus 106 respectively.

The present invention presents a data flow-through execution unit, where the function of the execution unit is assigned and then data is pumped through it. This saves processing time and adds to the flexibility of data processing.

The ADS 82 provides information to the DRP 86 via bus 108, and receives information from the DRP 86 via bus 110. The ADS 82 provides address control information to a memory interface unit 112 via bus 114. The memory interface unit 112 is coupled to the DMA master bus 68 and the communication bus 58. The memory interface unit 112 is bidirectionally coupled to ADS 82 via bus 116. The ADS 82 reads data from and writes data to the memory interface unit 112 via bus 116. The memory interface unit 112 provides information directly to the DRP 86 via bus 118.

The ADS 82 also includes register(s) 120 for writing control information for each task. The ADS 82 is basically the engine that pumps data through the DMA 54. Based on configuration bits set by the MDE 80 per the application program, the ADS 82 fetches as many operations as required and optionally routes them to the execution units. The ADS 82 evaluates termination conditions and stores the result in memory or elsewhere. The ADS 82 may store results internally in loop-index registers. Similarly, results may be provided to an EU as an operands. Operation of the ADS 82 is controlled by a state machine, as is operation of the MDE 80.

Figure 5:
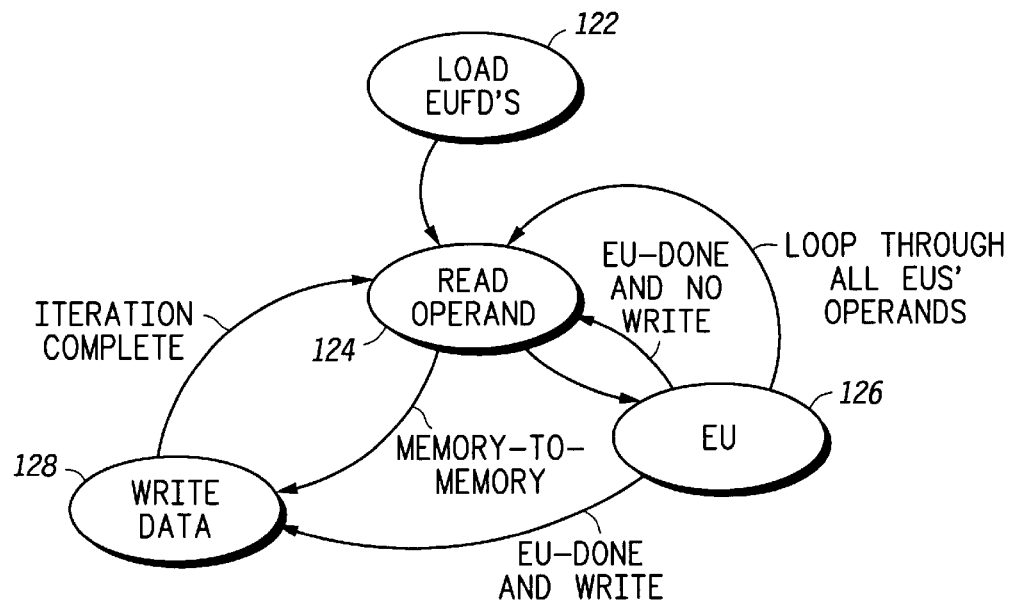
FIG. 5 illustrates, in state diagram form, execution of operations within a DMA controller as in FIGS. 3–4 in accordance with one embodiment of the present invention.

FIG. 5 illustrates the state machine operation of the ADS 82. Basically, the ADS 82 performs loop execution control and sequences data movement. At state 122 function descriptors are loaded into each of the execution units. The execution unit function descriptors, or EUFDs, specify the operation to be performed. This may be a Boolean operation, a multiplication, an addition, an error check, a data compression or decompression, or any operation implementable by an execution unit. An EUFD is loaded into each execution unit as needed specified by the function numbers in the DRDs. Once all of the function descriptors are loaded, the DMA 54 transitions to state 124 to read operand(s). The operands are the data values used in the body of the FOR loop. Note that in an alternate embodiment, the EUs may store EUFD information internally, avoiding the need to load EUFDs at state 122.

From state 124, if the DRD indicates that an execution unit is to be used, the DMA 54 transitions to state 126, and the DRP 86 passes data to that execution unit. The DMA 54 loops through state 124 and state 126 until all required operands are retrieved. For memory to memory transfers, the DMA 54 transitions from state 124 to state 128 to write data to memory. Similarly, after all required operands are retrieved, the DMA 54 transitions from state 126 to state 128. Once the iteration is complete, the DMA 54 transitions back to state 124. Note that data may not be written at state 128, but data may be retained for later processing. Basically, the DRD describes the following cases: no action; write data to memory; just accumulate; or write to internal register, such as a loop-index register.

FIG. 3 describes one mode of operation referred to as "precise-mode." In precise mode, consistent with C language program execution, the loop increments are performed at the end of the loop. If there are multiple indexes, the increments are clustered at the end of the loop. In an alternate mode, referred to as an "imprecise mode," the loop increment is performed as the index is used within the loop, thus saving time and avoiding wasted increments, such as where another index satisfies a loop termination condition. Some alternate modes allow interruption during an iteration. In imprecise mode the ADS 82 does not have to wait for all source operands to be loaded before starting a new iteration. Instead, the ADS 82 may continue to load operands if they are ready while skipping over operands which are not ready. EU operands are loaded in the order specified in the DRD. It is possible, for example, that EU0 88 is loaded multiple times on multiple iterations while EU1 90 is not loaded at all. The first operand for EU1 90 may be the result of EU0

88. If EU0 88 is able to receive new operands, i.e. its pipeline is not full, and the termination condition has been checked, the next iteration of EU0 88 may start. In this way different sources are at different iterations, allowing the ADS 82 to continue useful operand loading while waiting for results from an EU. In this way, the ADS 82 pipeline has less empty spots.

In the present embodiment, the length of the iteration pipeline may be limited by the EU pipeline depth. For example, in one embodiment, the EU has a pipeline depth of three (3) cycles.

As an example, if within a task the first operation is a multiplication to be performed by the EU0 88, the ADS 82 will read the operands for the multiplication operation and provide them to EU0 88 where they will be multiplied. If there is a second operation, for example, a logical operation, to be performed by EU1 90, the state machine then transitions back to state 124 to read the operands for the second operation. The operands are provided to the EU1 90 to execute the logical operation. If this is the end of the operations specified in the task, the execution units are done and the process transitions to write the result(s) in memory. Note that the EUs may be either logic units, such as a logic unit with accumulator unit (LUAC) or mathematical, such as a multiply/accumulate unit (MAC). Alternate embodiments may implement any number of additional functions in the EUs, including but not limited to data compression and decompression or specialized data communication functions.

With respect to iteration termination, the ADS 82 terminates execution of the loop on several conditions. In a first case, the termination conditions are met and all iterations have completed. In a second case, at least one EU indicates a loop has terminated and the ADS 82 has completed executing the iterations it started. In a third case, a peripheral indicates that a frame completed and the ADS 82 has completed executing the iterations that have started.

The ADS 82 also provides other indications regarding its condition. For example, the ADS 82 indicates that it is stopped when the initiator is no longer requesting and the ADS 82 has completed executing the iterations that have started.

As discussed earlier, FOR tasks include the descriptors in memory, some of which are illustrated in FIGS. 6–13. FIG. 6 illustrates a first data entry in the task descriptor table for storing descriptor information. A task is described by a sequence of descriptors, where the first descriptor of a task is an LCD. Multiple index variables may be used, but are limited to a predetermined number according to one embodiment. Similarly, multiple termination conditions are allowed per loop.

Continuing with FIG. 6, the illustrated descriptor includes 32 bits and is referred to as the LCD entry, where bits are identified by LCD[ ]. Starting from the left side, a bit LCD[31] is provided to select LCD or DRD. When set, LCD[31] indicates an LCD, and when cleared indicates a DRD. Next, LCD[30] is an extension bit, labeled "EXT." When the EXT bit is cleared, an LCD following this LCD is the beginning of a new nest level and this LCD has no extensions or a DRD following it defines that loop's body. Note that this LCD may be an extension of a previous LCD. When the EXT bit is set, the LCD following this LCD is an extension LCD that is part of one FOR loop descriptor.

Continuing with FIG. 6, when set, bits LCD[29], LCD[21] and LCD[12] indicate indirect addressing, much like the '*' used in the C language. Each of bits LCD[29], LCD[21] and LCD[12] relates to the following index initialization or termination condition fields. The entry includes two index initializations per row, a first field in bits LCD[28:23], and a second field in bits LCD[20:15]. In the present embodiment, the first field is referred to as the "Index 0 Initialization." This is the initial value for the loop-index variable. The six (6) bits illustrated indicate the variable or entry number for this task where the actual initial value resides. Note that if bit LCD[29] is set, the value in the Index 0 Initialization field is a pointer to where the initial value resides. The Index 1 Initialization field is similar, but relates to the second index variable, if any. The termination condition is provided in the field of bits LCD[11:6].

The three fields, are encoded according to the following scheme:

| LCD[28:23], LCD[20:15], or LCD[11:16] | | |
|---|---|---|
| LCD[28:23], LCD[20:15], or LCD[11:6] | Index variable Initialization or Termination Condition | |
| | C syntax | Explanation |
| 0nnnnn | indexN | Loop-index initialization or loop termination value is the value in the loop-index specified by bits "nnnnn" in ADS register(s) 120. |
| 10nnnn | varN | Loop-index initialization or loop termination value is the value of the variable specified by bits "nnnn" in variable table. |
| 11nnnn | &varN | Loop-index initialization or loop termination value is the address of the variable specified by the bits "nnnn" of the variable table. |

The bit LCD[22] allows for a single loop-index value to be defined by the sum of Index 0 Initialization, LCD[28:23], and Index 1 Initialization, LCD[20:15] and the index1 increment field LCD[2:0].

As discussed above, Index 1 Initialization, LCD[20:15] indicates the variable number offset for this task in which either the actual initial value of this loop-index variable resides or the pointer to the initial value of this loop-index variable resides, depending on the status of LCD[21].

The termination condition, LCD[11:6] specify the variable or entry that contains either the termination condition compare value or address that causes the loop to terminate or the pointer to the compare value or address of the compare data depending on the status of LCD[12].

Continuing with FIG. 6, LCD[14:13] indicate to which index variable the termination condition applies. As illustrated in the encoding table below, if these bits are '10,' this LCD is treated as an initialization to literal constant. Most other bits in this LCD aid in generating the literal constant. If these bits are '11,' neither index variable in this LCD are part of the termination condition and this LCD is not a literal constant initialization LCD.

The termination usage field is encoded according to the following scheme:

| LCD[14:13] | |
|---|---|
| LCD[14:13] | Termination Usage |
| 00 | Termination condition used with Index 0 variable in this LCD |
| 01 | Termination condition used with Index 1 variable in this LCD |
| 10 | Literal constant |
| 11 | Termination condition NOT used with this LCD |

If termination indirection is used, the ADS 82 fetches the data before each iteration and verifies the termination condition.

In the first case, LCD[14:13]='00,' the termination condition specified in LCD[11:6] applies to the Index 0 variable for this LCD. Similarly where LCD[14:13]='01,' the termination condition applies to the Index 1 variable for this LCD. In both of these cases, an index variable is used to determine when to stop iterations of the FOR loop. In a next case, a literal constant is used, as indicated by LCD[14:13]='10.' The literal constant is used for initialization, and initializes one loop index to that value. In one embodiment, a literal constant is formed by the concatenation of LCD[29:15] and LCD[12:0] to a four (4) bit Literal Constant Base residing in the Task Table. In this case, LCD[30] determines which of two Literal Constant Base(s) to use. Finally, a termination condition may not be used with this LCD, LCD[14:13]='11,' as is the case for an infinite loop, or to allow another LCD of the same loop specify the termination condition.

The Index 0 Increment Var, LCD[5:3], and the Index 1 Increment Var, LCD[2:0], specify which of a predetermined number of increment amounts to use for the corresponding index variable. The possible increment amounts are stored in the Variable Table. In one embodiment, the increment amounts have signed binary encoding, and are located in bits INC[15:0].

The loop-termination comparison is encoded in bits INC[31:29] of the Variable Table entry as follows:

| INC[31:29] | Comparison |
|---|---|
| 000 | Exactly one-time operation |
| 001 | less than ( < ) |
| 010 | greater than ( > ) |
| 011 | not equal to ( != ) |
| 100 | equal to ( == ) |
| 101 | less than or equal to ( <= ) |
| 110 | greater than or equal to ( >= ) |
| 111 | No comparison, loop forever |

Note that when LCD[31] is set, the descriptor is considered an LCD. LCDs to be treated as Literal Constants are presented first in a group of LCDs that define the loop. When the LCD is used as a Literal Constant, the EXT bit is used as a "BASE" bit, and they inherently have an extension.

Each task is defined by at least one LCD and at least one DRD. Each DRD is represented by a particular format. Two formats are illustrated in FIGS. 7 and 8. Note that the DRD of FIG. 8 may have multiple DRD extensions, similar to LCD extensions, of various formats when execution units (EUs) are used in the DRD.

The entry illustrated in FIG. 7 is referred to as DRD1A, and bits are identified as DRD1A[ ]. This entry is used to identify a transaction where no operand is sent to an EU, and usually is used for simple memory-to-memory moves. DRD1A can be used with an EU provided that the EU function does not need any arguments, such as for random number generation, etc. In this case, the EU is specified by the Memory Write Source, described hereinbelow. The function of the EU is then assigned by function number in DRD1A[3:0]. Each type of EU may have multiple functions. The functions are encoded into corresponding function numbers.

An EU may be specified in the Memory Write Source, DRD1A[10:4], in which case the result or output of an EU is the source of data to be written to memory. For memory-to-memory DMAs or variables, the Memory Write Source may be a memory read. Note that this is the same data size as used to identify the LCD descriptor, LCD[ ], but the significance of the bits change to DRD descriptor information when the first bit, LCD[31] is cleared, i.e. LCD[31]=0. As in this case, the data entry is storing DRD information, it is referred to as DRD1A[ ], where DRD1A[31] indicates whether the descriptor is an LCD or DRD, and is cleared for DRD. When set, the bit DRD1A[30] indicates that the next descriptor is an extension of this DRD. Otherwise, the next descriptor is not an extension of this DRD, but is either a new DRD or an LCD.

As discussed hereinabove, the present invention allows for multiple levels of nesting within a FOR loop. A bit referred to as the "MORE" bit, and illustrated as the bit DRD1A[28] in FIG. 7, is used to identify the level of nesting. If the next descriptor is not a DRD extension, then the MORE bit defines whether what follows is at the same nesting level. For example, if the current DRD's MORE bit is set, then what follows is at the same nest level. When the MORE bit is cleared, a following DRD is at the next outer-more level of nesting, while a following LCD is at the same nesting level. In other words, when asserted, the MORE bit indicates that for this loop, another DRD at the same nesting level or a nested LCD at one higher level follows this one, and when negated no other DRD or LCD follows this one for this loop, a subsequent DRD belongs to the next-outer loop, and a next LCD belongs to a new loop at the same nesting level. The bit DRD1A[29] is a "TYPE" bit identifying a first or second format for this DRD. In the present embodiment, two formats are available, DRD1A as illustrated in FIG. 7, and DRD2A as illustrated in FIG. 8. The first format provides for a DRD involving memory-to-memory transfer of data, while the second format allows for operations involving arguments to execution units (EUs). The TYPE bit, is cleared for DRD1A format and set for DRD2A format. Note that alternate embodiments may use alternate methods of identifying the format of the DRD, such as multiple bits to select from specific operations, combination of operations, or combination of memory-to-memory data transfers and EU operations.

The "TFD" bit is DRD1A[27] and DRD2A[27] and when set indicates that the ADS 82 will assert a transmit frame signal on completion of the loop described by this DRD. If the TFD bit is cleared, the ADS 82 will not assert a transmit frame signal on completion of the loop.

Often the body of the loop will involve multiple DRDs to implement a desired operation. Note that nested loops are allowed in the present embodiment, which provides many powerful capabilities. The bit DRD1A[27] is referred to as the Transmit Frame Done (TFD) bit and indicates when the ADS 82 sends a frame done signal upon completion of a loop. Bit DRD1A[26] is referred to as an "INT" bit, and when asserted interrupts the processor after completing this loop.

Bits DRD1A[25:21] form a field referred to as Initiator and specify which device is causing this loop to execute. Multiple DRDs within the same loop typically use the same initiator. The DRD1A format is for a memory-to-memory data transfer, and therefore the DRD descriptor specifies the size of data to be read and written, as well as the source and destination locations. To specify the size of the read and write data, DRD1A[20:19] and DRD1A[18:17] provide 2-bit fields which are encoded to indicate the number of bits, such as char (8-bit), short (16-bit), or int (32-bit), or longword. The memory write destination is encoded and stored in bits DRD1A[16:11]. The memory write destination designates where data is to be written. Similarly, the memory write source is encoded and stored in bits DRD1A[10:4]. The memory write source identifies from which part of the DMA the write data is taken; this data is then written to the memory write destination. Finally, when an EU is used as a memory write source, bits DRD1A[3:0] represent an EU function number corresponding to the function to be performed by the EU used as the memory write source. This EU function requires no operands. The field is ignored when the memory write source is not an EU.

While the DRD1A[ ] is usually used for memory-to-memory data transfers, the DRD2A[ ]is used for DRD(s) where operands are provided to EUs. DRD2A is illustrated in FIG. 8. The TYPE bit, DRD2A[29] is set in the DRD to signify a DRD2A type transaction. Further, differences between DRD1A and DRD2A include bits DRD2A[16:0] which specify the EU functions to be performed during this loop. The bit DRD2A[16] is reserved for future expansion.

As discussed hereinabove each execution unit function number corresponds to a user-programmable definition stored within the EU. The functions are supplied by the ADS 82 and stored in registers within each EU according to the present embodiment. For example, if one EU is a multiply-accumulate unit (MAC), there may be up to 16 functions encoded in the four bits DRD2A[15:12]. Each encoding instructs the MAC to perform one of its 16 functions. These are user definable and user programmable functions. Note that the functions of four EUs may be specified in DRD2A[ ].

If the LCD bit is cleared, the TYPE bit is set, and the EXT bit is set, the entry is a DRD descriptor and a DRD2A type specifically. Subsequent to a DRD2A entry, the EU operation is specified by descriptors stored in entries DRD2B1 and/or DRD2B2, as illustrated in FIGS. 9–10. If the TYPE bit is set it indicates that the rest of this DRD extension will be defined as DRD2B2, and if the TYPE bit is cleared it indicates that the rest of this DRD extension will be defined as DRD2B1. The entry DRD2B1 is sufficient to identify one execution unit having two inputs or operands. Here the EU number is identified in DRD2B1[13:12] and the source of each of its two operands, operand 0 and operand 1, are identified in DRD2B1[11:0]. the memory write source indicates where to get the data which will be written to the memory write destination and is encoded the same as the corresponding field in DRD1A. Note that a DRD2B1 does not extend to another DRD2B1, but may extend to a DRD2B2 if one EU has more than two inputs, or operands.

Continuing with FIG. 9, the memory write destination DRD2B1 [27:22] and memory write source DRD2B1 [20:14] are as in DRD1A. Similarly, several fields are provided for EU operand sources. These fields include DRD2B1[11:0]. EU operand 0 sources specify the source of this EU's first operand, referred to as an even-numbered operand, or some other data that the EU is expecting. Note that the order of the operands is significant in many operations. If the EU number for this operand is different from the EU number in the previous EU descriptor, this operand is the EU's first operand or first expected data. If they are the same, then this is the next even-numbered piece of data that the EU is expecting, whether an operand, accumulator-load-data, or other EU-specific data. The bits DRD2B1[5:0] specify the source for this EU's second operand, any odd-numbered operand, or some other data that the EU is expecting. If the EU number is different from the previous EU descriptor field, this operand is this EU's second operand or second expected data. Similarly, if the EU number is the same, but the operand fields are set to "nothing," this operand is this EU's second operand or second expected data. If they are the same, then this is the next odd-numbered piece of data that the EU expects, whether an operand, accumulator load-data, or other EU-specific data. As indicated in FIG. 9, this descriptor corresponds to one EU, specifically EUA.

FIG. 10 illustrates DRD2B2[ ] and is similar to DRD2B1 of FIG. 9, but includes multiple EU information, specifically EUB and EUA. Again, an EU number is provided for each EU. Here, DRD2B2[25:20] and DRDB2[11:6] are similar to DRD2B1[11:6] and represent a first operand, any even-numbered operand or some other data the EU expects. The bits DRD2B2[19:14] and DRD2B2[5:0] are similar to DRD2B1 [5:0] and specify a second operand, any odd-numbered operand, or some data the EU expects.

These descriptors provide information used to perform the FOR loops from which a task is built. Note that each task begins with an LCD and ends with a DRD. The descriptors are stored and used sequentially in the present embodiment, but may be stored in non-sequential positions and retrieved during execution. Each level of nesting in a task includes at least one DRD, even if it does not perform any actions.

These entries are better understood with respect to FIG. 4, where an operand source identifies the input to the DRP 86, illustrated on the left side of the DRP 86. Each operand source is routed to an EU input. The result, or output, of each EU is similarly identified. For example, a task may first process data through EU0 88 and then use the result of processing by EU0 88 as a source operand for EUn 92. Note that each EU may have two (2) or more operands depending upon their function.

The following example helps to clarify the use of DRDs. In a first case, the FOR loop is given as:

```
for ( i=0; j=55; i < 22; i++; j+=2 ) {
    *i=j;
}
```

This operation takes data from the loop index j and writes it to the indirect address identified by *i. The write destination is *i, and the write source is j. This FOR loop is implemented with entry DRD1A as follows:

| | | | | | | | DRD1A[31:0] | | | | |
|---|---|---|---|---|---|---|---|---|---|---|---|
| LCD | EXT | TYPE | MORE | TFD | INT | INITIATOR | RDATA SIZE | WDATA SIZE | MEM. WRITE DEST. | MEM. WRITE SOURCE | EU FN |
| 0 | 0 | 0 | 0 | | | I/On | | | *i | j | |

In a second example, the FOR loop is specified as:
for (i=0; j=55; i<22; i++; j+=2) {
    *i = add(i,j)
}

This second loop takes data from loop index j, manipulates the data according to some function, add( ), and writes the data to the address identified by i. The write destination is again *i, however in this case the write source is the output of an EU, where the EU performs the function f( ). In this case, the EU requires only two (2) operands, i.e two (2) operand sources, then DRD2B1 may be used with DRD2A.

This FOR loop is implemented with DRD2A and DRD2B1 as follows:

the operands for application to EU 0. A given EU function may require a certain order of operands to the EU.

If the EU requires more than two (2) operands, then DRD2B2 is used. Note that DRD2B1 may be used with an extension to DRD2B2, or multiple DRD2B2 entries may be used. This is the case, for example, where:

*i=and (add (i,j, var3, var2)), var4).

| | | | | | | | DRD2A[31:0] | | | | | |
|---|---|---|---|---|---|---|---|---|---|---|---|---|
| LCD | EXT | TYPE | MORE | TFD | INT | INITIATOR | RDATA SIZE | WDATA SIZE | EU 0 FN | EU 1 FN | EU 2 FN | EU 3 FN |
| 0 | 1 | 1 | 0 | | | I/On | | | ADD | | | |

| | | | | DRD2B1[31:0] | | | | | |
|---|---|---|---|---|---|---|---|---|---|
| LCD | EXT | TYPE | RSRV | MEMORY WRITE DEST. | RSRV | MEMORY WRITE SOURCE | EU | EU operand 0 SOURCE | EU operand 1 SOURCE |
| 0 | 0 | 0 | | *i | | EU 0 | 0 | i | j | where EU 0 FN identifies the add operation. Here, the TYPE bit indicates a DRD2A entry. The DRD2A identifies the function of the EU to be used, EU 0, and DRD2B1 identifies This requires multiple EU operand source designations, and may be implemented using DRD2A, DRD2B1, and DRD2B2 as follows:

| | | | | | | | DRD2A[31:0] | | | | | |
|---|---|---|---|---|---|---|---|---|---|---|---|---|
| LCD | EXT | TYPE | MORE | TFD | INT | INITIATOR | RDATA SIZE | WDATA SIZE | EU 0 FN | EU 1 FN | EU 2 FN | EU 3 FN |
| 0 | 1 | 1 | 0 | | | I/On | | | ADD | AND | | |

| | | | | DRD2B1[31:0] | | | | | |
|---|---|---|---|---|---|---|---|---|---|
| LCD | EXT | TYPE | RSRV | MEMORY WRITE DEST. | RSRV | MEMORY WRITE SOURCE | EU | EU operand 0 SOURCE | EU operand 1 SOURCE |
| 0 | 1 | 0 | | *i | | EU 1 | 0 | i | j |

| | | | | | DRD2B2[31:0] | | | | |
|---|---|---|---|---|---|---|---|---|---|
| LCD | EXT | TYPE | RSRV | EU | EU operand 2 SOURCE | EU operand 2 SOURCE | EU | EU operand 0 SOURCE | EU operand 1 SOURCE |
| 0 | 0 | 1 | | 0 | var3 | var2 | 1 | EU0 | var4 |

In these examples, it is clear that a great variety of functions may be implemented using the resources available in the present invention.

The master DMA engine (MDE) illustrated in FIG. 4 operates to parse descriptor information for each loop in a task. Descriptor information is stored in the Task Descriptor Table (TDT), both LCD and DRD are stored sequentially to define each task. The MDE 80 then presents that information to the appropriate modules, such as the ADS 82, the arbitrator 66, the priority decoder 78, the DRP 86, or the EUs.

Note that the present invention effectively decouples the function code (function number or FN) from the selection of the operand for the function. The function code is similar to an operation code, or opcode, for the EU, that defines an operation for the EU. By decoupling the function code from operand selection, it is possible to change the operands without changing the function code. For example, in one complex instruction identified by DRDs, the function code for the EU is set and then multiple operand sets for the EU are assigned. The order of operation and the source of operations is specified in the DRD. Typically, the operation of a processor is specified in one field as the opcode. An operand set is then identified for each opcode. The operand set may be a single operand, and includes the operands to be operated on for the specified operation. In the present invention, the EU is first configured with the function code, and then multiple operand sets may be specified. Note that a single operand set may be specified also. In this way, the operation of the EU is invoked for each operand set without reconfiguring the EU. The decoupling of the op code from the operand selection saves instruction interpretation overhead and transfer time on the bus.

Figure 11:
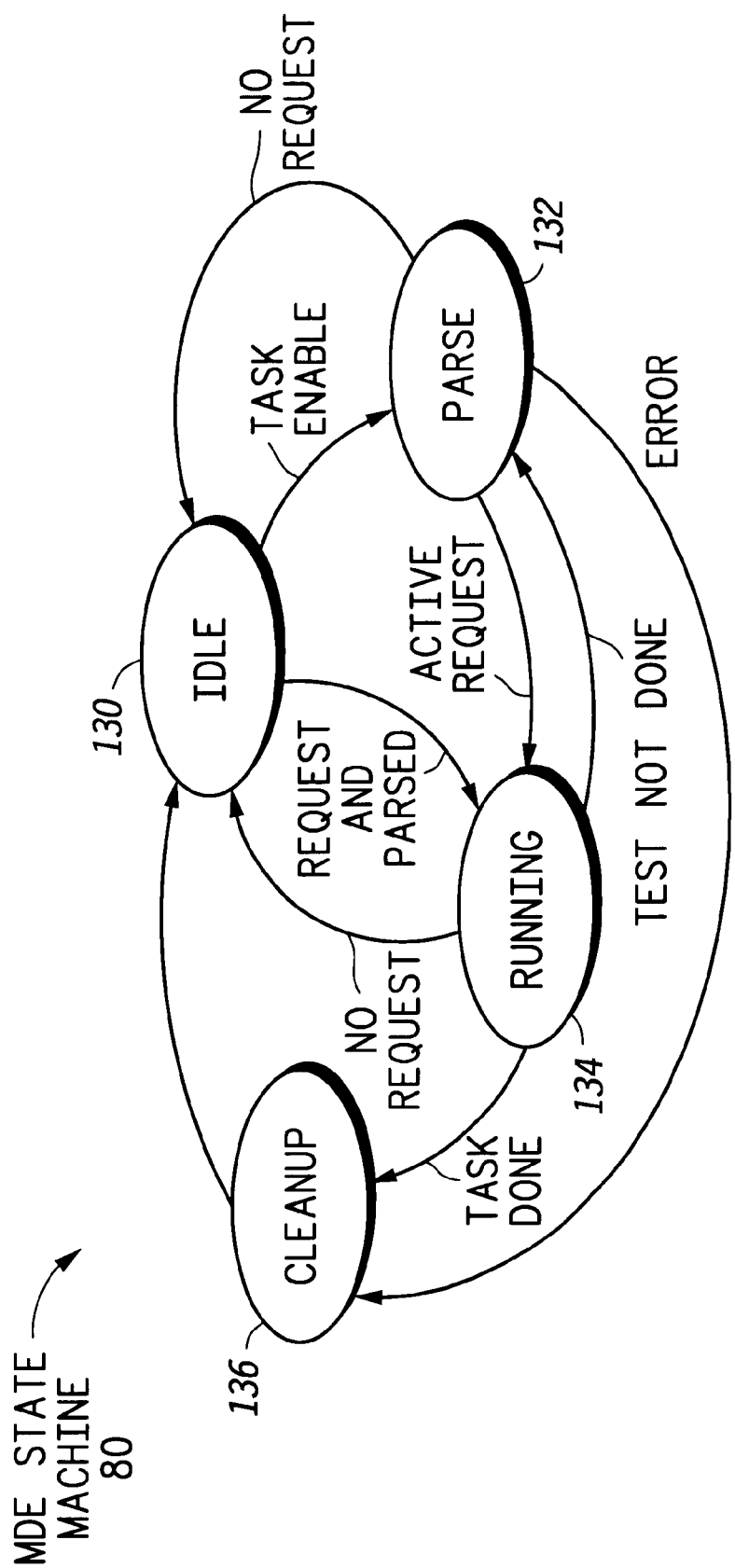
FIG. 11 illustrates, in state diagram form, operation of a master DMA engine within a DMA controller as in FIGS. 3–4 in accordance with one embodiment of the present invention.

Operation of the MDE 80 is illustrated in the state diagram of FIG. 11, Signals from the priority decoder 78, such as a request signal, and signals from the processor 70, such as a task enable signal, drive the MDE 80 state machine. The MDE 80 receives some signals from the processor 70 via the priority decoder 78. The MDE 80 in turn, provides the priority decoder 78 with next-state information, the current descriptor's initiator, and interrupt signals. In one embodiment, a handshake signal is provided for task acknowledge. While in the IDLE state 130, when a task enable signal is asserted the MDE 80 transitions to state 132 to parse the descriptor information for the next loop in the enabled task. After parsing, if no request is received from the priority decoder 78, the MDE 80 returns to the IDLE state 130. The parsed descriptor information for the next loop of the enabled task is ready to run the loop when a request is received. If the request is asserted after the loop is parsed, then the MDE 80 transitions to state 134 to run the next loop. Running each loop involves performing the body of the FOR loop. For example, during state 134 one loop may involve providing data to one EU, which performs an assigned function.

While in the IDLE state 130, if there is an active request and the descriptor information for the next loop has already been parsed, then the MDE 80 transitions from the IDLE state 130 to state 134 to run the next loop.

From state 132, once the loop information is parsed, the MDE 80 transitions to state 134 if there is an active request. Any time before completion of a task, if a request is extinguished the MDE 80 transitions back to the IDLE state 130. After each loop is completed, the MDE 80 transitions back to state 132 to continue parsing loops. This continues until all loops are completed within the enabled task. In the parse state 132 the MDE 80 parses the descriptors in the Task Descriptor Table to prepare for the next loop's execution. The MDE 80 may use information from the Task Table to identify descriptor start and end in the TDT as well as information in the Variable Table.

While parsing the descriptors for this loop, the MDE 80 loads loop and address information into the registers of the ADS 82. When the MDE 80 encounters any semantic errors while parsing the descriptors, it stores an error code in the Task Table, exits this task, and generates an interrupt. For an error, MDE 80 will write the error code at the end of state 132. During the run state 134, the MDE 80 waits for the ADS 82 to complete loop execution. Note that during the run state 134, the MDE 80 may also generate a request for an interrupt indicating that the loop is done, that interrupts the processor 70. The state machine within the MDE 80 may include a number of other steps that provide smooth operation and add to the flexibility and stability of the DMA 54.

When the MDE 80 generates an interrupt signal upon completion of a loop, the MDE 80 first places an interrupt code identifying the interrupt type in a status location for this task, stored in the Task Table. After this the interrupt signal is asserted. Note that the interrupt signal may be asserted during the parse state 132, or the run state 134. In the present embodiment, the MDE 80 asserts an interrupt signal for one clock cycle. Additionally, the MDE 80 may output a signal to the priority decoder 78 requesting an arbitration of a new task. The MDE 80 and the priority decoder 78 communicate various information to facilitate selection, initiation, and completion of a task. This communication includes control and status information, as well as information necessary for control of the state machine within the MDE 80.

The priority decoder 78 provides the interface for external communication channels and memory transfers. This interface is 5 based on using general DMA handshake signals, such as request, acknowledge, and done. The DMA 54 supports multiple tasks, where each task uses multiple request input signals. The priority decoder 78 is then user-programmable allowing identification of each request to be used and their associated priorities. Once tasks are parsed and the associated requests determined, the priority decoder 78 prioritizes all asserted request inputs. Note that in one embodiment, the priorities of each initiator are specified in registers within the DMA. The tasks specify which initiator to use at any one time, but do not specify the priority.

The MDE 80 effectively controls the operation of the DMA 54. The MDE 80 expects the user to initialize several memory locations, including the Task Table and Variable Table(s). As illustrated in FIG. 4, the MDE 80 includes a TASKBAR 94 that points to the position in memory storing the Task Table. The Task Table is illustrated in FIG. 12 having a plurality of memory locations, one for each task. The entries in the Task Table point to the location where task descriptors are located in the Task Descriptor Table. In other words, each task has its own unique Task Descriptor Table (TDT) start pointer and TDT end pointer. Additionally, each task identified in the Task Table has a unique Variable Table pointer. The Task Table also stores control and status information. The TDT start pointer points to the first descriptor, which is an LCD, of that particular task. The other descriptors, both LCDs and DRDs, consecutively follow the first one in memory. Note that special branching provisions particular to a specific embodiment may violate the consecutive order. The TDT end pointer points to the last descriptor, which is a DRD, of that particular task.

The Task Table entries include the Variable Table pointer for each task, that points to the top of the memory space where this specific task's Variable Table resides. In one embodiment, the entry in the Task Table includes indication bit(s) to signify the pointer to the Variable Table is modified. In this case the pointer is located in a predetermined portion of the Task Table.

The Task Table may also store information such as the base address for this task's function descriptors, control bits for reparsing, precise increment mode, ignoring an error code, pack data decision, integer mode selection, and bursting on read and/or writes. Status information and error codes are also stored in the Task Table. The status information is visible during operation and particularly useful upon receiving an interrupt.

The Variable Table is used to store constants, initial values, and increment values for a given task. Variables may be modified by the DMA by pointing a loop index to the variable and writing indirectly off the pointer. Prior to executing a particular task, that task's Variable Table is initialized with the appropriate data. When the user writes a program, or when the assembler converts the user's program (s), the MDE 80 uses the initialization variables and constants loaded into the Variable Table. The initial index variables in the LCD indicate to the MDE 80 the space to be allocated for the resulting variables in the loop registers of the ADS 82. The space is allocated consecutively, allowing the user to identify the register and variable association.

Typically, a programmer initializes the TASKBAR 94 to identify the start address of the Task Table. In one embodiment, 16 5 tasks are defined by unique TDT start pointer, TDT end pointer, Variable Table pointer, control information, and status information. The TDT start pointer then points to the first descriptor, or LCD, for a particular task. The Variable Table pointer points to the top of an associated memory space. Control information may relate to issues such as reparsing, precise increment mode, error code settings, packing data, integer mode, bursting, etc.

Continuing with FIG. 12, the Initiator/Priority Assignments are illustrated, where 32 initiators are specified. They are then prioritized for arbitration purposes when multiple requests are received by the priority decoder 78.

FIG. 13 illustrates other registers within the DMA 54. The Initiator/Task Registers are located within the priority decoder 78 and associate each task number with its current initiator. The Initiator/Task Registers illustrate an encoding by task according to one embodiment of the present invention. Each task has a number assignment and identifies an initiator. In response to the processor assigning or enabling a task, the priority decoder 78 identifies the initiator associated with that task according to this encoding.

Also illustrated in FIG. 13 are Loop Registers having a dynamic value and corresponding increment pointer and nest level. Loop register space is initialized by the MDE 80 in the ADS 82. The loop registers are the physical manifestation of the loop-index variables. Implementing them as registers inside the ADS 82 increases efficiency. Specifically, when a user writes a program, or when the assembler converts the program, the MDE 80 will use the initialization variables and constants in the variable table. The initial index variable in the LCD tells the MDE 80 to allocate space for the resulting variables in the ADS 82 loop registers. The space is generally allocated consecutively, but may be organized in any manner that allows the user to identify the register allocated for each variable.

The dynamic value is the current value of a loop-index register in the ADS 82 based on the results of computation of some number of iterations of the FOR loop. The dynamic value(s) stored in the loop-index registers may be operand addresses, the operand data, or byte-count values. Each loop-index register is associated with an increment pointer value that indicates which increment register is used to determine the increment value for the loop-index register. The increment register value indicates the increment amount of the loop-index register. The increment register value is offset by the transfer size if the loop-index register is used as a read operand or as a pointer. Each loop-index register has an associated nest level tag. The loop-index registers for the current nest level of execution are the only valid loop-index registers for that loop.

An increment pointer points to one of a set of variables that indicate the amount to increment (or decrement) a loop-index register. The nest level indicates the nesting depth associated with the LCD that utilizes the particular loop register. Also within the register(s) 120 are the termination registers that include a termination value, a compare value and a loop register number, and the increment registers that store increment values.

The termination registers are used to determine the value to compare against the loop-index value. Each termination register is associated with a termination indirection tag. This tag indicates if the termination register value is to be used as the compare value or if the termination is indirect. If indirect, the termination register value is used as an address to fetch compare data. The loop register number indicates the association of loop-index and termination register. If the loop-index register of a given termination register matches the current nest level, that termination register determines the termination condition for the current loop. The termination registers have several types of possible comparisons indicated by the compare type value. Note that indirection is done prior to the start of a new iteration and a termination read may be done at state 124 of FIG. 5 to fetch the compare data.

In the present embodiment, all of the registers in the ADS 82 are loaded or initialized by the MDE 80 as a result of the decoded information from the LCDs and DRDs.

Another aspect of the present invention allows multiple initiators to process through one portion of a DMA controller. In prior art DMA controllers, these portions are referred to as "channels" that process one service. In the prior art data processing system 2 of FIG. 1, a DMA 4 is illustrated having three channels. In one example, I/O0 16 is an input only device, while I/O2 24 is an output only device. In other words, data is provided to DMA 4 from I/O0 16 and is written from the DMA 4 to I/O2 24. In this case, channel DMA0 14 reads data from I/O0 16, stores it in memory, but does not do any further processing. The channel DMA1 18 processes the data received by channel DMA0 14, and the channel DMA2 22 writes the result as output to I/O2 24. In this example, each channel is functionally unique. No channel performs multiple functions, but rather each channel is dedicated to either data retrieval, data manipulation, or data storage.

In contrast to the prior art data processing system 2 of FIG. 1, the present invention defines channels according to tasks, where a single channel of a DMA performs all three functions, data retrieval, data manipulation, and data storage. In this way, the present invention provides a method of implementing a single algorithm that follows data from source to destination. By providing this functionality within the DMA, the performance of the system is increased as the DMA acts in parallel with the processor, alleviating the processor of coordination between DMA channels.

Figure 14:
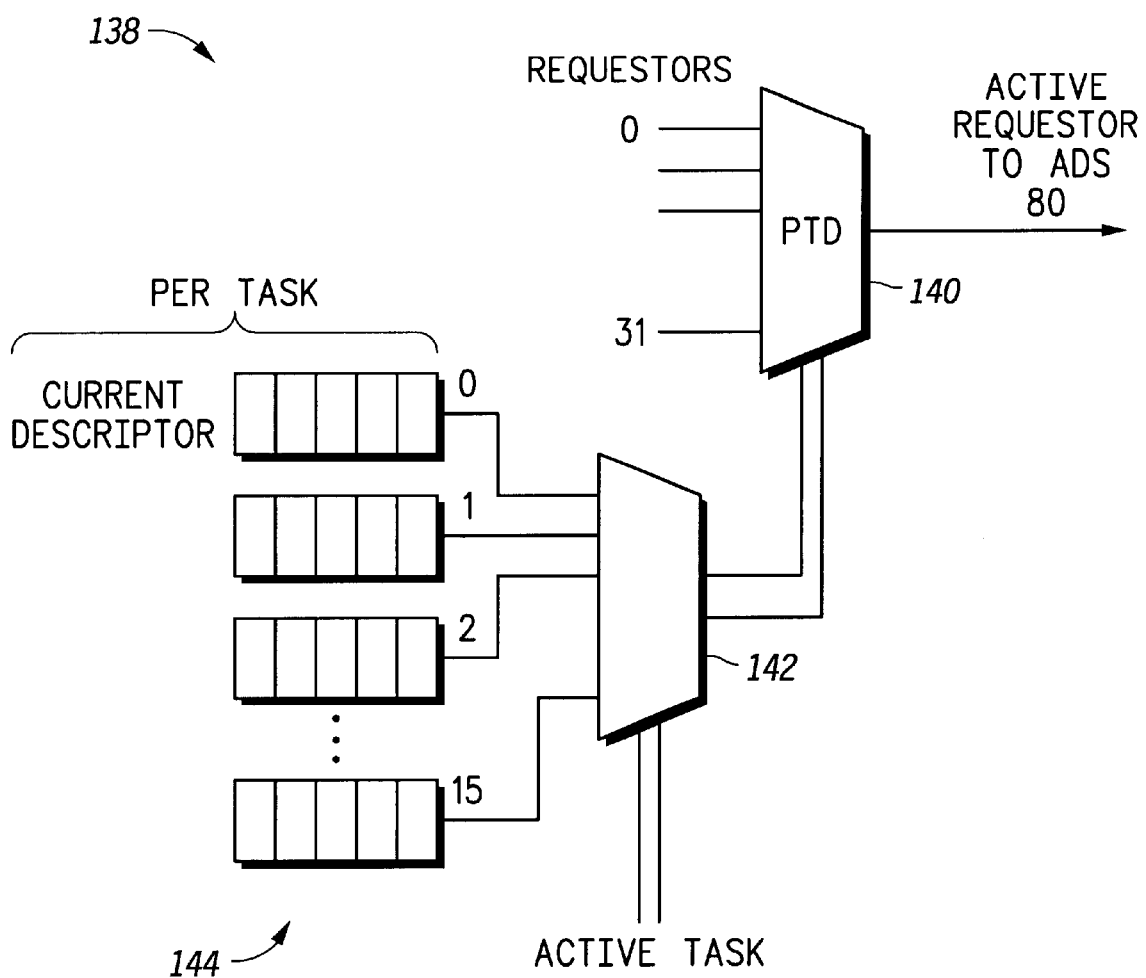
FIG. 14 illustrates, in block diagram and logical form, priority assignment of requesters within a DMA controller as in FIGS. 3–4 in accordance with one embodiment of the present invention.

FIG. 14 illustrates a portion 136 of the priority decoder 78 that selects a requester based on an enabled task, according to one embodiment of the present invention. As illustrated, a MUX 138 is coupled to a multiple requestors, 0, . . . , 31. MUX 138 receives a control signal from MUX 140. The MUX 140 selects descriptor information corresponding to a current active task, i.e. enabled task. The descriptor information is stored in registers 142, and is provided as input to the MUX 140. The active task signal serves as a control for the MUX 140. The active task signal is generated by the processor, which enables the task. Which task is selected to run is determined by the priorities of the initiators. The MUX 140 provides information from the descriptors to MUX 138. The information is sufficient for the MUX 138 to identify the requestor associated with the task. The MUX 138 then outputs an active requestor in response. The active requestor is provided to the ADS 82 and MDE 80. The requester, or initiator, is identified in a descriptor on a per-movement basis.

The present invention provides a DMA that understands entire algorithms. The DMA is programmable using simple C language type constructs. Using the basic building blocks a great variety of operations, both mathematical and logical, can be performed. The DMA provides ease of programming and high throughput. High performance filtering is available using the algorithmic approach of the present invention.

Note that the present invention is a dedicated data movement engine that increases the flexibility of prior art DMA controllers without adding the overhead of a general purpose microprocessor.

For example, the present invention uses a subset of C language constructs to process and manipulate data. In one embodiment, this subset includes only FOR task constructs. The present invention does not include an instruction set in the traditional sense, having a predetermined set of instructions. Rather the present invention uses this subset to implement a variety of functions. The present invention is a dedicated engine for data movement and manipulation, and does not support function calls, such as subroutine calls. The present invention sacrifices such functions to achieve high-performance.

The present invention provides a method of data movement and manipulation using easy programming methods. High bandwidth is possible as many functions may be implemented in the DMA, where the processor is only involved in enabling the task. This increases data movement as well as providing faster manipulation of data. An added advantage is the use of well known data structures and programming languages. Alternate embodiments may implement these functions using alternate language constructs and reassigning bit fields in the LCD and DRD.

Those skilled in the art will recognize that modifications and variations can be made without departing from the spirit of the invention. Therefore, it is intended that this invention encompass all such variations and modifications as fall within the scope of the appended claims.

What is claimed is:

1. In a data processing system, comprising a processor and a memory coupled to the processor, a data movement engine (DME) adapted to directly execute FOR tasks assigned by the processor, said task comprising a movement of a data element between a first location in said memory and a second memory storage location, the DME comprising:
   an execution unit (EU) adapted to perform a selected one of an arithmetic operation and a logical operation; and
   a FOR task controller adapted to perform said data movement and to select, in response to said FOR task, one of the arithmetic operation and the logical operation to be performed by the EU on said data element.

2. The DME as in claim 1, wherein the FOR task is defined by:
   at least one loop control descriptor (LCD) comprising control information used to perform the FOR task; and
   at least one data routing descriptor (DRD) identifying the selected one of the arithmetic operation and the logical operation to be performed by the EU.

3. The DME as in claim 2, further comprising:
   a plurality of execution units (EUs), each adapted to perform a selected one of the arithmetic operation and the logical operation, each of the plurality of EUs having an input and an output; and
   wherein the FOR task controller is adapted to select, in response to the FOR task, at least one of the plurality of EUs for performance of the selected one of the arithmetic operation and the logical operation.

4. The DME as in claim 3, further comprising:
   a data router coupled to input/output adapted to provide an input to each of the plurality of EUs and adapted to receive an output from each of the plurality of EUs.

5. The DME as in claim 4, wherein the data router is adapted to provide an output from one of the plurality of EUs as an input to one of the plurality of EUs.

6. The DME as in claim 2, wherein the DME provides an indicator signal to a peripheral conducting a data communication protocol directing completion of a data frame in the data communication protocol.

7. The DME as in claim 2, wherein the DME terminates a loop upon completion of a received data frame in a data communication protocol.

8. The DME as in claim 2, wherein the DME provides an interrupt signal to the processor upon termination of a loop.

9. The DME as in claim 1, further comprising:
   a priority selection unit adapted to select from among a plurality of requesters and assert an active requestor signal to the FOR task controller.

10. The DME as in claim 9, wherein the FOR task is defined by:
    at least one loop control descriptor (LCD) comprising control information used to perform the FOR task; and
    at least one data routing descriptor (DRD) identifying the selected one of the arithmetic operation and the logical operation to be performed by the EU; and
    wherein the FOR task controller assigns a requester to the FOR task based on at least one field in the DRD.

11. The DME of claim 1, wherein the FOR task comprises a finite impulse response filter (FIR) operation.

12. The DME of claim 1, wherein the FOR task comprises a digital signal processing (DSP) operation.

13. The DME as in claim 1, wherein the second memory storage location is an internal loop index register.

14. The DME as in claim 1, wherein the second memory storage location is the execution unit.

15. In a data processing system, comprising a processor and a memory coupled to the processor, a method for moving data comprising the steps of:
   the processor assigning a FOR task, the FOR task comprising a movement of a data element between a first location in said memory and a second memory storage location;
   retrieving the data element from the first memory location;
   selecting one of an arithmetic operation and a logical operation to perform on the data element;
   performing the selected one of the arithmetic operation and the logical operation on the data element; and
   storing a result of the selected one of the arithmetic operation and the logical operation on the data element to the second memory location.

16. The method as in claim 15, further comprising the steps of:
   retrieving at least one loop control descriptor (LCD) having control information used to perform the FOR task; and
   retrieving at least one data routing descriptor (DRD) identifying the selected one of the arithmetic operation and the logical operation to be performed by the EU.

17. The method as in claim 15, further comprising the steps of:
   selecting a second one of an arithmetic and a logical operation to perform on the result of performing the selected one of the arithmetic operation and the logical operation; and
   performing the selected second one of the arithmetic operation and the logical operation on said result.

18. The method as in claim 15, further comprising the step of:
   selecting from among a plurality of requestors; and
   asserting an active requester signal to the FOR task controller.

19. In a data processing system, comprising a processor, a data movement engine (DME), and a plurality of requesters coupled to the processor, a method for moving data comprising the steps of:
   assigning a task to the DME, the task comprising a movement of a data element from a first memory location to a second memory location;
   retrieving a first plurality of descriptors for the task, wherein each descriptor of the first plurality of descriptors identifies a different requester of the plurality of requesters;
   selecting one requester from among the plurality of requestors based on the plurality of descriptors for the task; and
   providing a first active requestor signal identifying the selected one requestor to the DME; and
   in response to receiving a request from the selected one requester, performing the movement of the data element from the selected one requestor.

20. The method as in claim 19, further comprising the steps of:
   assigning a second task to the DME, the second task comprising a movement of a second data element from a third memory location to a fourth memory location;
   retrieving a second plurality of descriptors for the second task, wherein each descriptor of the second plurality of descriptors identifies a different requestor of the plurality of requesters;
   selecting a second requestor from among the plurality of requesters based on the second plurality of descriptors for the second task; and
   providing a second active requestor signal identifying the selected second requester to the DME; and
   in response to receiving a request from the selected second requester, performing the movement of the data element from the selected second requester.

21. In a data processing system, comprising a processor and a memory coupled to the processor, a data movement engine (DME) adapted to directly execute tasks assigned by the processor, said task comprising a movement of a data element from a first location in said memory to a second location in said memory, the DME comprising:
   an execution unit (EU) that is capable of performing an arithmetic operation and a logic operation;
   a task controller adapted to perform said data movement and to select, in response to said task, one of the arithmetic operation and the logical operation to be performed by the EU on said data element; and
   a priority selection unit adapted to select a requestor from a plurality of requesters.

22. In a data processing system, comprising a processor and a memory coupled to the processor, a data movement engine (DME) adapted to directly execute FOR tasks assigned by the processor, said task comprising a movement of a data element from a first location in said memory to a second location in said memory, the DME comprising:
   an execution unit (EU) adapted to perform a selected one of a compression operation and a decompression operation and to perform an arithmetic operation and a logic operation; and
   a FOR task controller adapted to perform said data movement and to select, in response to said FOR task, one of the arithmetic operation and the logical operation to be performed by the EU on said data element.

* * * * *